United States Patent [19]
Lambert

[11] 3,854,076
[45] Dec. 10, 1974

[54] DUAL LEVEL PLUGGING CIRCUIT
[75] Inventor: Joe Chester Lambert, Roanoke, Va.
[73] Assignee: General Electric Company, Salem, Va.
[22] Filed: Nov. 19, 1973
[21] Appl. No.: 416,805

[52] U.S. Cl.............. 318/341, 318/345, 318/373, 318/375
[51] Int. Cl. ......................................... H02p 5/16
[58] Field of Search ........... 318/341, 345, 373, 375

[56] References Cited
UNITED STATES PATENTS
3,660,738   5/1972   Anderson et al. ............ 318/375 X
3,697,845   10/1972  Soffer et al. ................. 318/341
3,777,237   12/1973  Anderson..................... 318/345
3,803,472   4/1974   Konrad ........................ 318/341

Primary Examiner—Gene Z. Rubinson
Attorney, Agent, or Firm—James H. Beusse; Harold H. Green, Jr.

[57] ABSTRACT

A circuit for selectively diminishing the conductive interval of a pulse control circuit during plugging of a d.c. motor drive system. A thyristor is utilized to bypass a portion of an inductive winding in the charge reversal circuit of a commutating capacitor. The voltage on the capacitor then reverses itself in a shorter than normal time to allow a more rapid commutation of a main thyristor.

14 Claims, 4 Drawing Figures

PATENTED DEC 10 1974 3,854,076

DUAL LEVEL PLUGGING CIRCUIT

BACKGROUND OF THE INVENTION

The present invention relates generally to controls for electric drive systems and, more particularly, to means for achieving improved performance of an electric vehicle during the plugging operation.

Battery-powered electric vehicles have been known and used for decades, particularly in industrial applications characterized by relatively short travel times or where a vehicle is required which is relatively noiseless or which produces no pollutants. Until recent years, a typical driving arrangement for such a vehicle comprised a source of energy such as a battery, a traction motor, and a group of resistors coupled in series between the motor and the battery. Electromechanical means such as contactors were provided to selectively shunt portions of the resistances, varying the total impedance between the motor and the battery and therefore the amount of effective voltage applied across the motor terminals. Although the control means by which an operator can control the speed of such a vehicle commonly comprised an infinitely variable lever or accelerator pedal, operation of the vehicle was necessarily somewhat erratic because of the necessarily increments of resistance being switched in or out of the circuit in response to the operation of the speed control lever.

In recent years an improved form of motor control, termed pulse control, has been developed for such vehicles. Typically, the series resistances of the prior art are replaced by one or more controlled thyristors, commonly silicon controlled rectifiers (SCRs). A gating control and a commutating circuit are associated with the main SCR to gate it into conduction and to extinguish it, respectively. A variation in the conductive periods of the SCR and/or the frequency of it operation determines the time-averaged or net effective voltage arising across the terminals of the motor. By increasing the average on-time of the SCR, the mark-space ratio and thus the effective battery voltage applied across the motor terminals can be varied continuously from 0 to practically 100 percent.

It has been found that the deceleration or braking of an electric vehicle can be substantially enhanced by re-connecting the traction motor so as to provide electrodynamic braking. This operation, termed "plugging," for a series motor comprises a reversal in the relative connection of the armature and field windings. The net effect is to produce a back emf in the armature which aids, rather than opposes, battery voltage. With the reversal of the back emf, current flow through the motor control circuit will tend to increase greatly and if not limited, will produce severe braking which will bring the vehicle to a violent halt. In addition, the increased current flow can produce deleterious effects in the power circuitry.

With switched resistor type motor controls additional resistance was typically inserted between the motor and the battery during the plugging operation in order to limit current. Commonly, mechanisms were provided to add the extra resistor in response to a sensed armature voltage or current. With pulse control systems, it is only necessary to decrease the mark-space ratio of the main SCR to a value which allows a lessened amount of current to flow.

However, several problems inhere in this approach. In many circuits in commerical use, the on-time of the main thyristor is constant, the nonconductive interval or equivalently the frequency of operation of the gating control being varied so that the overall mark-space ratio of the thyristor is commensurately varied. Under plugging conditions, most control circuits automatically enter a phase of operation in which a fixed mark-space ratio is obtained, independent of operator control. The circuits are ordinarily designed to effect the mark-space ratio which is optimal under most anticipated plugging conditions. However since the on-time of the SCR is fixed, although the circuit may act to vary the mark-space ratio, under conditions where a very large back emf is generated by the motor an undesirably large amount of current may pass through the thyristor during the initial conduction period after commencement of plugging. If too large a current is passed, the motor will begin to self-excite and "run away," braking with undesirable severity effect despite the fact that the gating control has rendered the main thyristor non-conductive. It will therefore be understood that it would be desirable to provide means for lessening the width of conductive pulses during the plugging operation to a value which precludes the possibility of self-excitation and allows smooth operation.

It is therefore an object of the present invention to provide means for decreasing the minimum conductive time of a thyristor of a pulse control circuit during a plugging operation.

It is another object of the present invention to provide means for controllably lessening the time constant for commutation in an electrical vehicle pulse control system during plugging.

SUMMARY OF THE INVENTION

Briefly stated, in accordance with one aspect of the invention the foregoing objects are achieved by providing a circuit including the series combination of a capacitor and an inductive winding, and means for effectively coupling the series circuit so constituted in circuit with a first load current carrying thyristor of an electric motor pulse control system. A controlled switching means such as another thyristor bypasses a portion of the inductive winding, so that current from the capacitor flows through only a portion of the winding. Means are provided to render the controlled switching means conductive when the vehicle is in the plugging mode. After plugging has ceased, the switching means is again rendered non-conductive, restoring the conductive time of the first thyristor to its original value.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
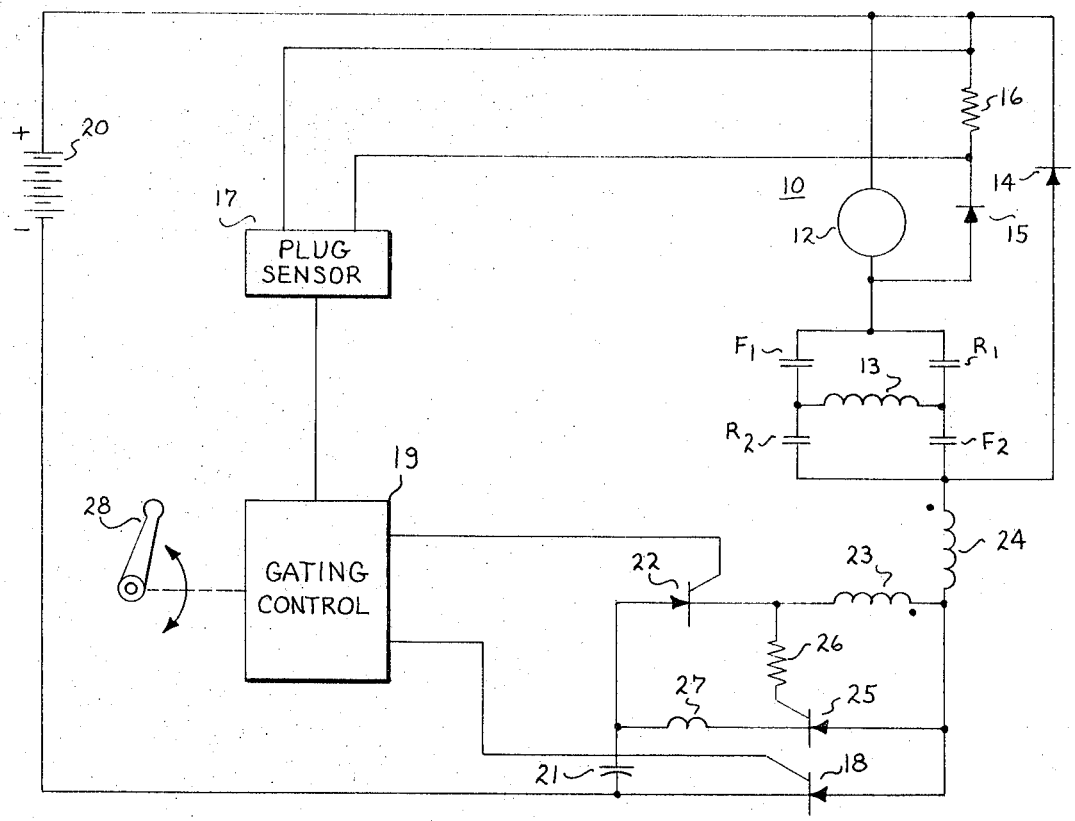
FIG. 1 is a schematic diagram of a pulse control electric vehicle drive system.

FIG. 1 shows in schematic form the basic elements of the drive system of an electric vehicle. A motor generally designated 10 comprises an armature 12 and a field winding 13. Two pairs of contactors $F_1$, $F_2$ and $R_1$, $R_2$ are provided for selectively coupling field 13 in series with armature 12. A flyback diode 14 maintains current through the motor during interpulse periods, as explained below, and a plugging diode 15 allows current to circulate through armature 12 when the vehicle is being plugged, or braked by means of the motor. The resistor 16 coupled in circuit with diode 15 serves to support a voltage which is applied to a plugging sensor 17 for indicating commencement of plugging. A thyristor, shown here as SCR 18, is periodically energized by means of gating control 19 to couple the motor to a battery 20 at a controlled rate. In order to extinguish or commutate SCR 18, a capacitor 21 is coupled by means of a second SCR 22 and an inductive winding 23 across first SCR 18. In the illustrated embodiment winding 23 comprises a secondary of a transformer whose primary winding is depicted at 24. The commutation circuit includes a third SCR 25, a resistor 26 and choke 27.

The operation of the circuit shown in FIG. 1 will now be described, making particular reference to the enumerated elements of the Figure. Upon initial energization of the vehicle, either contactors $F_1$ and $F_2$ or $R_1$ and $R_2$ are energized to effect motion in a forward or a reverse direction, respectively. Should contactors $F_1$, $F_2$ be closed, current will flow through armature 12 and through field 13 from left to right. The current flow then charges the upper plate of commutating capacitor 21 positive with respect to ground. The charging of capacitor 21 can be accomplished initially by means of a bleeder circuit used for start-up purposes, and then during subsequent operations by means of second SCR 25, as will be described hereinafter.

The distributed inductance of the system, along with the inductance of primary winding 24, causes the voltage accrued upon capacitor 21 to "overshoot" and exceed that of the battery. When the inductive effect is exhausted, capacitor 21 begins to discharge in a reverse direction through SCR 25, commutating the SCR. At this point, first SCR 18 and third SCR 22 are energized. The charge accrued upon the upper plate of capacitor 21 will now begin to flow through SCR 22, transformer secondary 23 and main SCR 18 to the lower plate of the capacitor in an attempt to equalize charge. However due to the inductive effect of winding 23, and to the transformer effect of magnetically coupled windings 23 and 24 an additional boost will be provided and capacitor 21 will be caused to charge, in a reverse direction, substantially above battery voltage. When the forward inductive effect of winding 23 has been exhausted the charge on capacitor 21 will have tendency to complete a full oscillation, i.e., flow backwards through SCRs 18 and 22 in the manner of a resonant circuit. However, due to the well-known characteristics of such thyristors the reverse bias commutates or extinguishes the SCR 22. The voltage at the cathode of the second commutating SCR 22 is now suitable to initiate conduction of third SCR 25 by means of resistor 26, which couples the gate of SCR 25 to the cathode of SCR 22.

SCR 25 effectively connects the reversely-charged capacitor 21 across SCR 18. The reverse bias impressed across SCR 18 commutates it, the residual charge across capacitor 21 flowing through the power supply circuit to discharge the capacitor. Continued conduction of SCR 25 allows the current flow to proceed until the upper plate of capacitor 21 is charged to a suitable positive potential. The charge thus accrued is stored until SCRs 18 and 22 are again gated into conduction by gating control 19. During the interval when SCR 18 is nonconducting the inductance of motor 10 effects continued current flow through the motor by way of flyback diode 14.

It will therefore be seen that while the non-conductive time of first SCR 18 can be varied by changing the frequency of gating pulses supplied by gating control 19, in the illustrated example by means of adjusting manual lever 28 in order to vary the mark-space ratio, the on-time of SCR 18 remains fixed. In particular, the inductive and/or saturation characteristics of windings 23 and 24 play a primary role in determining the time necessary for charge to reverse upon capacitor 21 and commutation to occur. In a preferred embodiment, windings 23 and 24 are formed upon a magnetic core having a substantially rectangular hysteresis characteristic. When SCRs 22 and 18 are gated on, a predetermined number of volt-seconds must be applied to winding 23 before it saturates and allows current to flow. It will, however, be understood that in many cases a non-saturating inductive device may be used. In either case the reactance of the device will determine the minimum possible charge turn-around time for capacitor 21.

When it is desired to cause the driven vehicle to decelerate, it has been found advantageous to utilize the electrical braking characteristics of the motor to supplement other braking means provided on the vehicle. In achieving this, contacts $F_1$, $F_2$ are opened and contacts $R_1$, $R_2$ are closed so that the current through field winding 13 reverses and a negative torque is developed. As will be understood by those skilled in the art this causes a reversed back emf to be generated in armature 12, the current from which is conducted around a closed circuit loop by armature diode 15 and sensing resistor 16. When the modified voltage arising across resistor 16 and diode 15 is sensed by plugging sensor 17, a signal is applied to gating control 19 to reduce the pulse rate of SCR 18 to a suitable value. An example of a circuit for accomplishing this end is taught in U.S. Pat. No. 3,344,328 Morris entitled "Direct Current Motor Plugging Circuit."

It has been found that under certain circumstances undesirable operating characteristics arise during plugging when using the disclosed circuit. In particular, since none of the elements in the commutation circuit are affected by the operation of plugging sensor 17, the on-time of SCR 18 remains fixed. Selection of on-time depends upon many factors, and in order to achieve an optimum design an on-time is often selected which is unsuitable for plugging. In particular, under some circumstances enough current may flow during the initial on-time of SCR 18 to cause self-excitation of motor 10.

Once the motor becomes self-excited it will generate a reversed torque at a higher than desired rate, bringing the vehicle to an undesirably rapid halt despite the absence of subsequent conductive intervals of SCR 18.

Figure 2:
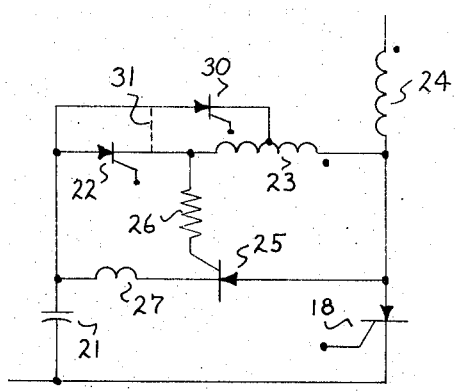
FIG. 2 is a portion of a control system of the type disclosed in FIG. 1 but utilizing principles of the present invention.

FIG. 2 discloses the above-described commutating circuit, modified in accordance with the principles of the present invention. For ease in explanation, elements corresponding to those shown in FIG. 1 retain the numerals used therein. In order to achieve more rapid reversal of charge on capacitor 21, a fourth thyristor, shown herein as SCR 30, is added to the circuit. In a preferred embodiment, SCR 30 is connected in shunt about SCR 22 and a portion of inductive winding 23. Under plugging conditions, gating control 19 ceases to apply gating pulses to second commutating SCR 22, and applies them instead to the gate terminal of SCR 30. The current from capacitor 21 will then flow through SCR 30 and that portion of inductive winding 23 which lies to the right of the point to which the cathode of SCR 30 is connected.

An alternative connection is indicated by dotted line 31 in which SCR 30 shunts only that portion of inductive winding 23 lying to the left of the connection point of the cathode of SCR 30. In this case it will be necessary to gate both SCRs 22 and 30 in order to provide a conductive path from the upper plate of capacitor 21 to the intermediate, tapped point of inductor 23. In either case, it will be seen that, by bypassing a portion of the inductive winding 23 a lessened transformer action and a smaller inductive "kick" will arise. Accordingly, the reversed voltage now accruing upon the lower plate of capacitor 21 will not be so high as was previously the case. The difference is not, however, so great as to detect the track from the ability of capacitor 21 to commutate first SCR 18.

Figure 3:
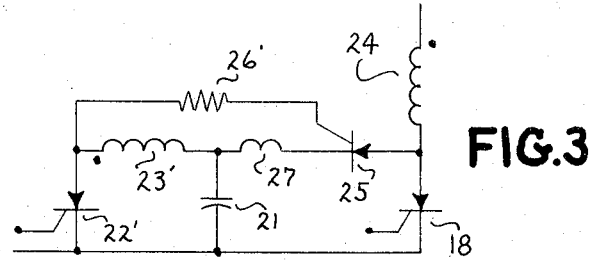
FIG. 3 is an alternative method of connection of certain of the components of FIG. 1.

FIG. 3 represents an alternative form of commutating circuit which may be used in the vehicle drive system of FIG. 1. For ease in description, like numerals are utilized for corresponding elements in FIGS. 1 and 2. It will be seen that commutating capacitor 21, choke 27 and first commutating thyristor 25 bear the same circuit relationship to main thyristor 18 as in FIG. 1. The charge reversal or "turnaround" loop for commutating capacitor 21, however, now comprises only inductive winding 23', which corresponds to windings 23 of FIG. 1, and a third SCR 22'. This circuit, disclosed in U.S. Pat. No. 3,660,738-Anderson et al., has the advantage that current flow effecting the charge reversal on capacitor 21 is not directed through main SCR 18.

In copending application Ser. No. 231,487, now U.S. Pat. No. 3,777,237 filed Mar. 24, 1971 entitled "Direct Current Power Control Circuit" and assigned to the assignee of the present invention alternative plugging means are taught whereby thyristors 18 and 22' are disabled, and thyristor 25 pulsed so that commutating capacitor 21 is interposed directly between motor 10 and voltage source 20. This effectively limits current flow from the motor for any given pulse since a d.c. current path is not present, and current will flow through motor 10 only until capacitor 21 is charged. At that time, thyristor 25 is commutated and thyristor 22' energized to reverse the charge on capacitor 21. As in FIG. 1, however, the minimum time required to reverse the charge upon capacitor 21 is still determined by the inductive characteristics of winding 23'. Therefore, while the absolute magnitude of current flow during any conductive period of SCR 25 is necessarily limited by the value of capacitor 21, the off-time of SCR 25 is limited to the minimum time required to reverse the charge on the capacitor.

This approach, sometimes termed "inhibit plugging," while satisfactory under many circumstances sometimes provides insufficient excitation current near the end of the braking process so that torque produced by the motor by braking purposes diminishes rapidly near the end of the operation.

Figure 4:
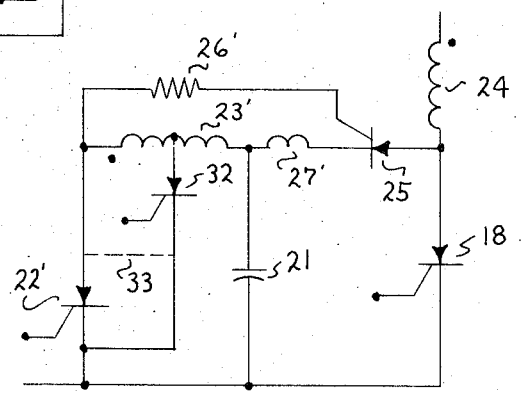
FIG. 4 is a portion of a control system as shown in FIG. 3, modified in accordance with the present invention.

FIG. 4 shows the commutation circuit of FIG. 3, modified in accordance with the principles of the present invention. A fourth thyristor 32 is inserted in the commutating circuit in order to allow current flowing from capacitor 21 during the charge reversal cycle to bypass a predetermined portion of inductive winding 23'. Thyristor 32 may be coupled from a point intermediate the ends of winding 23' to the cathode of the second commutating thyristor 22 as shown. During plugging a gating signal is applied to thyristor 32 rather than thyristor 22', and signals to thyristor 22' are inhibited. An alternative connection is indicated by dashed line 33, whereby thyristor 32 may be coupled in series with thyristor 22'. In the latter case, however, it is necessary to gate both thyristors 32 and 22'. While in either event the bypassing of a portion of inductive winding 23' is achieved in the latter case the forward voltage drop of both thyristors is placed in circuit with capacitor 21, thereby reducing somewhat the maximum reversed voltage achieved during the charge reversing cycle.

As will be evident from the foregoing description, certain aspects of the invention are not limited to the particular details of the examples illustrated, and it is therefore contemplated that other modifications or applications will occur to those as skilled in the art. It is apparent, for example, that in the illustrated embodiment the transformer comprising windings 23, 24 may be deleted and a reactor substituted in place of winding 23. It is accordingly intended that the appended claims shall cover all such modifications and applications as do not depart from the true spirit and scope of the invention.

What is claimed as new and desired to be secured by Letters Patent of the United States is:

1. In a pulse control system for an electric vehicle including a first thyristor for coupling a traction motor to a source of electric potential and a circuit for commutating the first thyristor after a predetermined time including a capacitor, an inductive winding and second and third thyristors, said second thyristor being energizable to couple said capacitor in circuit with the source of electric potential to allow the capacitor to charge in a first direction, and said third thyristor being energizable to allow the charge impressed upon said capacitor to flow through said inductive winding to reverse the polarity of capacitor charge, the improvement comprising a fourth thyristor coupled in said circuit and energizable to conduct charge from said capacitor about a portion of said inductive winding.

2. The invention defined in claim 1, wherein the series combination of said second thyristor and said capacitor is coupled in shunt about said first thyristor.

3. The invention defined in claim 2, wherein the series combination of said third thyristor and said inductive winding are coupled in shunt with said second thyristor.

4. The invention defined in claim 2, wherein the series combination of said third thyristor and said inductive winding are coupled in shunt with said capacitor.

5. In an electric vehicle control including a first thyristor adapted to electrically connect a traction motor to a source of electric potential, and means for adjustably controlling the rate of conduction of said thyristor, means for commutating the first thyristor comprising:
   a capacitor;
   a second thyristor for coupling said capacitor across first thyristor;
   a third thyristor;
   an inductive winding;
   means coupling said third thyristor and said inductive winding to said capacitor;
   a fourth thyristor energizable to bypass a portion of said inductive winding; and
   means responsive to the plugging of the traction motor to energize said fourth thyristor.

6. The invention defined in claim 5, wherein said fourth thyristor is coupled in parallel with said third thyristor and a portion of said inductive winding.

7. The invention defined in claim 6, wherein said thyristors are SCRs.

8. The invention defined in claim 7, wherein said inductive winding comprises the secondary winding of a transformer.

9. The invention defined in claim 5, wherein said third thyristor is coupled betweeen one end of said inductive winding to a point intermediate the ends thereof.

10. The invention defined in claim 9, wherein said thyristors are SCRs.

11. The invention defined in claim 10, wherein said inductive winding comprises a reactor.

12. The invention defined in claim 10, wherein said inductive winding is the secondary winding of a transformer.

13. Control means for an electric vehicle, comprising:
   a first thyristor for controllably coupling a traction motor to a source of electric potential;
   means for repeatedly gating said thyristor to vary the effective potential applied to the motor;
   means connecting the series combination of inductive means, a second thyristor and a capacitor in shunt with said first thyristor;
   a third thyristor coupling the intersection of said capacitor and said inductive means to the anode of said first thyristor; and
   a fourth thyristor coupling said one side of said capacitor to a point intermediate the ends of said inductive means.

14. Control means for an electric vehicle, comprising:
   a first thyristor for controllably coupling a traction motor to a source of electric potential;
   means for repeatedly gating said first thyristor to vary the effective potential applied to the traction motor;
   a capacitor;
   a second thyristor and an inductive means coupled across said capacitor for reversing a potential accrued thereon;
   a third thyristor coupling a point intermediate the traction motor and the first thyristor to one side of said capacitor for impressing a potential upon said capacitor; and
   a fourth thyristor coupling said one side of said capacitor to a point intermediate the ends of said inductive means.

* * * * *